United States Patent [19]
Kimura

[11] Patent Number: 5,366,671
[45] Date of Patent: Nov. 22, 1994

[54] METHOD OF PRODUCING A GLUCOMANNAN SPONGE

[75] Inventor: Kumiko Kimura, Onomichi, Japan

[73] Assignee: Shimizu Chemical Corporation, Japan

[21] Appl. No.: 196,727

[22] Filed: Feb. 15, 1994

[51] Int. Cl.$^5$ ............................................. B29C 67/20
[52] U.S. Cl. ...................................... 264/28; 264/41; 264/49
[58] Field of Search ............................ 264/28, 41, 49

[56] References Cited

U.S. PATENT DOCUMENTS

| | | | |
|---|---|---|---|
| 4,393,086 | 7/1983 | Masuyama | 264/109 |
| 4,412,947 | 11/1983 | Cioca | 264/49 |
| 4,522,753 | 6/1985 | Yannas et al. | 264/49 |
| 5,215,756 | 6/1993 | Gole et al. | 424/484 |
| 5,308,636 | 5/1994 | Tye et al. | 426/579 |

*Primary Examiner*—Allan R. Kuhns

[57] ABSTRACT

A spongy material is produced by the steps of suspending a suitable quantity of finely divided particles of a thermoreversible gel in an aqueous solution of glucomannan-rich flour, adding an alkali to the suspension, allowing the suspension to gel, freezing the gelled suspension, thawing and leaching the same with hot water to leave a skeleton of a water-insoluble, thermally irreversible gel matrix. After drying, a spongy material having a relatively uniform cellular texture and a pleasant feel to the skin is obtained.

12 Claims, No Drawings

METHOD OF PRODUCING A GLUCOMANNAN SPONGE

BACKGROUND OF THE INVENTION

This invention relates to a process for producing a spongy material useful for skin care and other purposes from glucomannan gel.

Glucomannan is a polysaccharide complex found in the tuber of an Amorphophallus species such as *A. konjac, A. kosiana, A. shichitoensis, A. companulatus, A. variabilis* and *A. oncophyllus*. Aqueous solutions of glucomannan produce a water-insoluble, thermally irreversible gel under alkaline conditions. This phenomenon has long been utilized in Japan and other countries for the production of "conjac", a processed food made from Amorphophallus tuber flour. It has long been known that when freezing and thawing "conjac" gels, a spongy mass or skeleton is formed by dehydration. This product is hereinafter referred to as "konjac sponge" Because of its pleasant feel to the skin, the konjac sponge is more suitable than natural sponge or polyurethane foams as materials of various skin care products such as cosmetic puffs, baby's skin cleaners and the like. However, the cellular texture of konjac sponge is not uniform and varies from coarse to fine depending upon its production conditions. In order to attain a uniform texture, the production conditions must be controlled carefully and delicately.

A need exists, therefore, for a process for producing konjac sponge having a uniform texture in terms of the pore size and shape in a cost-effective manner in the large scale production thereof.

SUMMARY OF THE INVENTION

The above need may be met by the present invention. According to the present invention, there is provided a process for producing a spongy material comprising the steps of:

(a) dissolving glucomannan-rich flour in water to make a solution,
(b) suspending in said solution a quantity of finely divided particles of a thermally reversible gel;
(c) adding an alkali to the suspension;
(d) allowing said suspension in a mold to coagulate into a solid mass containing said thermally reversible gel particles enclosed in the matrix of a water-insoluble, thermally irreversible glucomannan gel;
(e) freezing said solid mass;
(f) thawing and leaching said frozen mass with water at an elevated temperature to remove said thermally reversible gel particles with leaving a skeleton of said matrix gel; and
(g) drying said skeleton.

In a preferred embodiment, the glucomannan-rich flour is chosen from the group consisting of purified glucomannan flour and refined konjac flour. Also in the preferred embodiment, the thermally reversible gel is chosen from the group consisting of agar gels, gelation gels and carrageenan gels.

Using the process of the present invention, a spongy material suitable for making skin care products such as cosmetic puffs and baby's skin cleaners having a relatively uniform texture may be produced while allowing the pore size, shape and porosity to be controlled as desired.

DETAILED DESCRIPTION

Any glucomannan-rich flour derived from tubers of an Amorphophallus species, typically *A. konjac* may be employed. Purified glucomannan flour and refined konjac flour are preferred. Crude glucomannan-containing flour commonly referred to as "Konjac flour" is a product obtained by slicing, drying and grinding whole tubers of an Amorphophallus species, typically *A. Konjac* to a particle size of 0.5 mm or less. Refined konjac flour is produced by pneumatically classifying the crude konjac flour to remove starch or other impurities and has a carbohydrate content of about 80% or higher by weight. Purified glucomannans are produced from crude or refined konjac flour either by washing with water or by precipitating with ethanol to increase the glucomannan content to greater than 90% or higher. All of these products are commercially available.

Glucomannan is known to have a molecular weight in the order of $68-118 \times 10^4$ which is far greater than the molecular weights of other water-soluble polysaccharides and, therefore, exhibits the highest viscosity in a solution among water-soluble polysaccharides when compared at the same concentration. It is for this reason that the concentration of glucomannan is preferably at about 3 w/v % in step (a).

A variety of water-soluble polymers or gums capable of forming a thermally reversible gel are known. Other properties required for such thermally reversible gels are that they are soluble only in hot water and not insolubilized by the treatment with alkali and freezing. polypeptides such as gelatin and polyssacharides such as agar or carrageenan are preferable. To make a thermally reversible gel, the above material is dissolved in water while it is hot and then chilled. The concentration of the gel-forming substance must be determined so that the gel strength while cold and the water-solubility or leachability while hot are well balanced. This concentration generally lies between 3 w/v % and 5 w/v % and is preferably at about 4 w/v %. This gel is then divided into fine particles having a relatively uniform size and shape by cutting or other suitable techniques. The size and shape of divided gel particles are not critical provided they are relatively uniform in distribution. They may be cubic, cylindrical or spherical in shape and have a mean diameter of from 0.5 to several mm. The volumetric quantity of divided gel particles relative to the aqueous solution of glucomannan may vary in a wide range depending upon the desired porosity of the resulting sponge and preferably lies at a volumetric ratio of the gel to the glucomannan solution of from 1:10 to 2:1.

Subsequent to or concurrently with mixing the gel particles with the glucomannan solution, an alkali solution is added to the mixture to form a matrix phase of thermally irreversible, water-insoluble glucomannan gel. Although any alkali such as sodium hydroxide, sodium carbonate, potassium hydroxide or potassium carbonate may be used, a saturated lime water may preferably be used as is common practice in the production of edible konjac. Care should be taken during these steps so that the gel particles suspended in the glucomannan solution are not crushed or redissolved mechanically or thermally.

The mixture is then cast in a suitable mold such as vats or other containers and allowed to gel therein.

In the next step, the entire gel in the mold is placed in a freezing room for a sufficient time to freeze the entire mixture. The gelling step may be combined with the freezing step although this combination is less preferable.

The frozen mixture is then removed from the mold and immersed in a large volume of hot water to thaw and leach the mixture. This leaves a skeleton of partially dehydrated matrix gel. During this step, it may be desirable to exchange or supplement an additional volume of hot water and/or to squeeze the product for removing the water-soluble gel particles and other soluble impurities to the maximum extent.

Finally, the resulting spongy product is dried at an elevated temperature, e.g. between 100° C. and 120° C. and, if necessary, finished into a shape and size desired in the intended end use.

The following examples are intended to further illustrate the present invention without limiting thereto.

EXAMPLE 1

One kg of agar-agar is dissolved in 40 L of hot water (about 80° C ). This solution is poured into an enamelled steel vat and cooled to a temperature below 20° C. The resulting agar gel mass was cut into cubes of $2\times2\times2$ mm size. The whole quantity of cut particles was added to a cold solution (below 20° C.) of one kg of commercial refined konjac flour in 30 L of water while concurrently adding 10L of a saturated lime water with gentle mixing. An aliquot of the mixture was poured into an enamelled steel vat to 1 cm depth, allowed to stand for two hours at a temperature below 10° C. and then placed in a freezing box overnight. The frozen mixture in the form of a sheet was thawed and leached by immersing in a hot water bath (above 80° C.) with gentle agitation with exchange of hot water twice for one hour. The resulting wet sponge sheet was centrifuged and dried in an oven at 105° C. The resulting sponge sheet was relatively uniform in the pore size and shape with a pleasant touch feeling to the skin.

EXAMPLE 2

Example 1 was repeated except that one kg of agar-agar was replaced by the same weight of carrageenan. A sponge sheet having almost the same texture was obtained.

EXAMPLE 3

Example 1 was repeated except that one kg of agar-agar was replaced by 1.2 kg of gelation. A sponge sheet having almost the same texture was obtained.

I claim:

1. A process for producing a spongy material comprising the steps of;
    (a) dissolving glucomannan-rich flour in water to make a solution;
    (b) suspending in said solution a quantity of finely divided particles of a thermally reversible gel;
    (c) adding an alkali to the suspension;
    (d) allowing said suspension in a mold to coagulate into a solid mass containing said thermally reversible gel particles enclosed in the matrix of a water-insoluble, thermally irreversible glucomannan gel;
    (e) freezing said solid mass;
    (f) thawing and leaching said frozen mass with water at an elevated temperature to remove said thermally reversible gel particles leaving a skeleton of said matrix gel; and
    (g) drying said skeleton.

2. The process according to claim 1 wherein said glucomannan-rich flour is derived from the tuber of an Amorphophallus species.

3. The process according to claim 1 wherein said species is *A. konjac.*

4. The process according to claim 1 wherein said glucomannan-rich flour has a glucomannan content of greater than 80% by weight.

5. The process according to claim 5 wherein said glucomannan-rich flour is crude or refined konjac flour, or purified glucomannan flour.

6. The process according to claim 1 wherein said thermally reversible gel is derived from a water-soluble polysaccharide.

7. The process according to claim 6 wherein said water-soluble polysaccharide is agar or carrageenan.

8. The process according to claim 1 wherein said thermally reversible gel is derived from a water-soluble polypeptide.

9. The process according to claim 1 wherein said polypeptide is gelatin.

10. The process according to claim 1 wherein said alkali is a saturated lime water.

11. The process according to claim 1 wherein said solution has a glucomannan concentration of about 3 w/v %.

12. The process according to claim 1 wherein the volumetric ratio of said gel particles to said aqueous solution is from 1:10 to 2:1.

* * * * *